United States Patent

[11] 3,594,861

[72] Inventors Stefan Fischer;
Rainer Fischer, Am Wildtor 2, both of Lohmar, Bez. Cologne, Germany
[21] Appl. No. 692,083
[22] Filed Dec. 20, 1967
[45] Patented July 27, 1971

[54] BLOW-MOLDING APPARATUS
6 Claims, 1 Drawing Fig.

[52] U.S. Cl. ....................................................... 18/5
[51] Int. Cl. ....................................................... B29d 23/03,
[50] Field of Search .......................................... 18/5 BO, 5
BP, 5 BA, 5 BM; 264/94, 98, 99

[56] References Cited
UNITED STATES PATENTS
3,235,907  2/1966  Harwood et al. ............. 18/5 BO
3,243,847  4/1966  Fogelberg et al. ............. 18/5 BT
3,396,428  8/1968  Tahara ........................... 18/5 BO FOREIGN PATENTS
101,026     2/1965  Denmark ....................... 18/5 BO
1,004,314   9/1965  Great Britain ................. 264/98
1,498,659   9/1967  France .......................... 18/5 BP Primary Examiner—H. A. Kilby, Jr.
Attorney—Burton L. Lilling ABSTRACT: This invention relates to blow-molding apparatus wherein a mold is uniquely arranged with respect to an extruder head for movement into and out of the path of a parison from the extruder head for receiving the parison when in the path and discharging a molded object when out of the path.

PATENTED JUL 27 1971 3,594,861
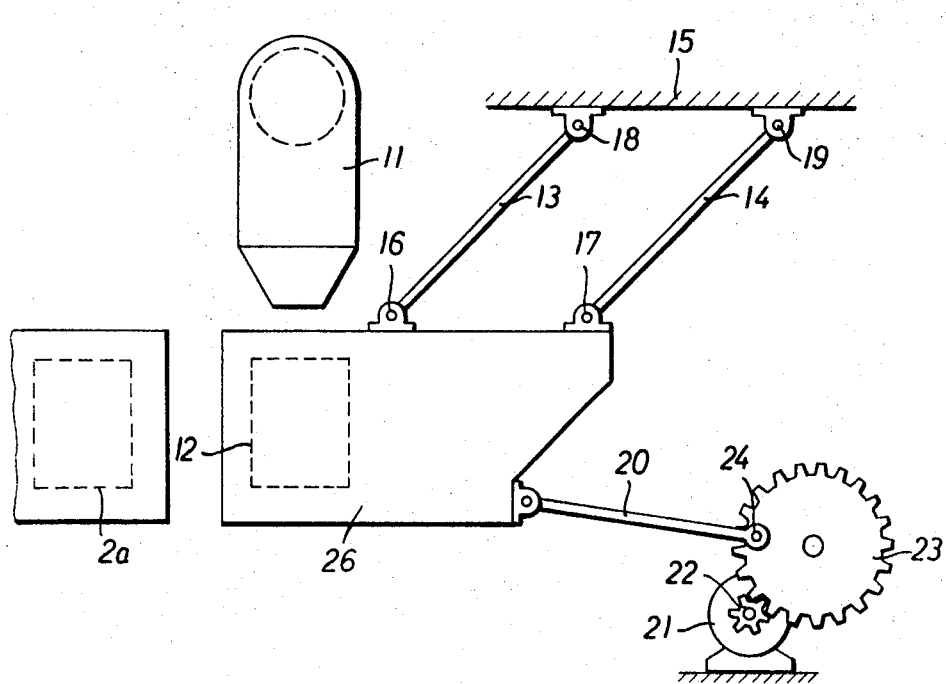
INVENTORS
STEFAN FISCHER
RAINER FISCHER
BY
Burton L. Lilling
ATTORNEY

BLOW-MOLDING APPARATUS

BACKGROUND OF THE INVENTION

While blow-molding apparatus has, in the past, been provided with means for moving a mold relative to the extruder head, such mounting of the mold has been extremely expensive, requiring both expensive guideways and control devices, such as hydraulic cylinders or the like, which mounting means has been quite complex and subject to damage and malfunction.

SUMMARY OF THE INVENTION

It is therefore an important object of the present invention to provide a blow-molding apparatus wherein unique and highly improved means serves to mount a mold for movement into and out of the path of a parison, which mounting means are extremely simple in construction, entirely foolproof and reliable in operation, and can be manufactured and installed at considerable savings in cost, maintenance and operation.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

In the single drawing there is shown a diagrammatic representation, in elevation, of a blow-molding apparatus constructed in accordance with the teachings of the present invention.

DESCRIPTION OF THE PREFERRED EMBODIMENT

Referring now more particularly to the drawing, it will there be seen that an extruder head is generally designated 11, preferably fixedly mounted by any suitable means (not shown), in communication with an extruder (not shown), and having its extrusion opening facing generally vertically downwardly for extruding a depending parison.

In the environment of the extruder head 11, there is a support structure 15, fixed relative to the extruder head, and located on one side of the latter. Below the extruder head 11 and support structure 15 is located a mold 12. While the structure designated 12 may include a blow mold together with the parts for the mounting and actuation thereof, for simplicity of terminology, the structure 12 will be considered as the mold. In the illustrated embodiment, the mold 12 (and its associated mold holding plate means 26, which may comprise a plate on both sides of the mold) extends generally horizontally, being illustrated in position beneath the extruder head 11 extending laterally across the vertically depending path of a parison extruded by the extruder head 11.

The mold 12 is mounted by the linkage means including a pair of generally parallel links 13 and 14 each extending between the support structure 15 and mold 12. In particular, the link 13 has its opposite ends connected to the mold 12 and fixed support 15, as at 16 and 18, respectively, while the link 14 has its opposite ends respectively connected to the mold and support structure at 17 and 19.

Thus, it will be appreciated that the mold 12 is movable from the illustrated position extending across the parison path of the extruder head 11 to a laterally displaced position, downward and rightward and out of the parison path. The linkage 13, 14 serves to mount the mold 12 for movement between its positions in and out of the parison path.

Movement of the mold 12 may be effected by an operating arm or link 20 connected at one end to the mold 12 and at its other end, as by pivot 24, to a crank wheel 23. The crank wheel 23 is suitably journaled for axial rotation and may be provided with peripheral spur teeth in driven engagement with a pinion 22 carried by a drive means or motor 21. Thus, upon actuation of motor 21, the pinion 22 and gear 23 rotate to cyclically shift the mold 12 laterally rightward and leftward out of and into the path of a parison depending from the extruder head 11. This shifting movement of mold 12 is synchronized with extruder-head operation, so that a parison is deposited in the mold 12 when the latter is in position beneath the extruder head, and an article molded of the parison may be discharged from the mold 12 when the latter is out of the parison path.

The instant mold-mounting means is advantageously suited for use in combination with a second mold 12a similarly mounted for lateral movement into and out of the parison path from the other side thereof. Thus, cycle time may be effectively reduced by employing a pair of molds 12 and 12a, the latter moving into the parison path when the former moves out, and vice versa.

In the preferred embodiment, it will be observed that the mounting links 13 and 14 may be substantially vertical when the mold 12 is positioned out of the parison path, for discharge of the molded object, so that little or no force is required to hold the mold in its discharge position. It is also appreciated that the links 13 and 14 may be of different lengths, if desired to effect tilting movement of the mold, rather than the parallel displacement illustrated. Of course, additional links 13 and 14 may be utilized, or the illustrated links may be employed in pairs, if desired. Also, by the particular operating mechanism 20—24, each movement of the mold 12 is accomplished by a partial rotation 180° of the crank wheel 23, so that a complete cycle of operation is accomplished with each rotation of the wheel 23. Thus proper synchronization of mold movement with extruder operation may be effected by intermittent actuation of motor 21 through a predetermined angular movement thereof or by continuous operation at a predetermined speed. In no event will it be necessary to reverse the direction of rotation of motor 21.

From the foregoing, it is seen that the present invention provides a blow-molding apparatus which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

We claim:

1. In a blow-molding apparatus, the combination comprising a support structure, an extruder head fixed relative to said support structure, a mold for receiving a parison from said extruder head, mounting means comprising at least one supporting member for movement of said mold into and out of the path of a parison extruded by said extruder head, said supporting member supporting said mold and being supported by at least two guide members hingedly connected at one end to said supporting member and at the opposite end to said support structure, said guide members being disposed successively in the direction of motion of said mold, whereby said mold is alternately moved in an arced path from one position beneath said extruder head to an adjacent position alongside such extruder head, and both of said positions residing in a common plane through said mold.

2. The blow-molding apparatus according to claim 1, including crank linkage means to effect alternate movement of said mold from a position beneath said extruder head to an adjacent position alongside said extruder head.

3. The blow-molding apparatus according to claim 2, including a second mold for receiving a parison from said extruder head during the time said first or other mold is in said adjacent position alongside said extruder head.

4. The blow-molding apparatus according to claim 3, including mounting means comprising at least one supporting member for movement of said second mold into and out of the path of a parison extruded by said extruder head, said supporting member supporting said second mold and being supported by at least two guide members hingedly connected at one end of said supporting member and at the opposite end to a fixed location.

5. The blow-molding apparatus according to claim 4, wherein said extruder head is fixed relative to said support structure and opens downwardly for extruding a vertically depending parison, and said molds alternately receiving a parison from a position beneath said extruder head and alternately being positioned for the subsequent blow-molding of said parison alongside said extruder head.

6. The blow-molding apparatus according to claim 1, wherein said guide members are disposed parallel with respect to each other.